(12) United States Patent
Sakami et al.

(10) Patent No.: US 10,759,935 B2
(45) Date of Patent: *Sep. 1, 2020

(54) RESIN COMPOSITION AND MOLDED BODY

(71) Applicant: DAIKIN INDUSTRIES, LTD., Osaka-shi, Osaka (JP)

(72) Inventors: Kazuki Sakami, Osaka (JP); Eiji Masuda, Osaka (JP); Kazuya Kawahara, Osaka (JP)

(73) Assignee: DAIKIN INDUSTRIES, LTD., Osaka (JP)

( * ) Notice: Subject to any disclaimer, the term of this patent is extended or adjusted under 35 U.S.C. 154(b) by 99 days.

This patent is subject to a terminal disclaimer.

(21) Appl. No.: 16/080,188

(22) PCT Filed: Mar. 6, 2017

(86) PCT No.: PCT/JP2017/008704
§ 371 (c)(1),
(2) Date: Aug. 27, 2018

(87) PCT Pub. No.: WO2017/154816
PCT Pub. Date: Sep. 14, 2017

(65) Prior Publication Data
US 2019/0055394 A1 Feb. 21, 2019

(30) Foreign Application Priority Data

Mar. 11, 2016 (JP) .................... 2016-048576
Jun. 20, 2016 (JP) .................... 2016-121933

(51) Int. Cl.
*C08L 33/16* (2006.01)
*C08G 18/48* (2006.01)
*C08L 101/12* (2006.01)
*C08G 18/75* (2006.01)
*C08G 18/76* (2006.01)
*C08L 75/06* (2006.01)
*C08G 18/42* (2006.01)
*C08G 18/73* (2006.01)
*C08G 18/44* (2006.01)
*C08G 18/77* (2006.01)
*B29C 45/00* (2006.01)
*C08L 23/06* (2006.01)
*C08L 23/12* (2006.01)
*C08L 25/14* (2006.01)
*C08L 27/06* (2006.01)
*C08L 55/02* (2006.01)

(Continued)

(52) U.S. Cl.
CPC .......... *C08L 33/16* (2013.01); *B29C 45/0001* (2013.01); *C08G 18/4277* (2013.01); *C08G 18/44* (2013.01); *C08G 18/4825* (2013.01); *C08G 18/4833* (2013.01); *C08G 18/4837* (2013.01); *C08G 18/4854* (2013.01); *C08G 18/73* (2013.01); *C08G 18/751* (2013.01);
*C08G 18/755* (2013.01); *C08G 18/758* (2013.01); *C08G 18/7621* (2013.01); *C08G 18/7671* (2013.01); *C08G 18/7678* (2013.01); *C08G 18/771* (2013.01); *C08L 23/06* (2013.01); *C08L 23/12* (2013.01); *C08L 25/14* (2013.01); *C08L 27/06* (2013.01); *C08L 55/02* (2013.01); *C08L 69/00* (2013.01); *C08L 75/04* (2013.01); *C08L 75/06* (2013.01); *C08L 101/12* (2013.01); *C08F 220/1818* (2020.02)

(58) Field of Classification Search
CPC ............ C08G 18/4837; C08G 18/4854; C08G 18/4277; C08G 18/755; C08G 18/751; C08G 18/7621; C08G 18/414; C08G 18/4833; C08G 18/73; C08G 18/771; C08G 18/7671; C08G 18/7678; C08L 23/06; C08L 23/12; C08L 27/06; C08L 101/12; C08L 75/04; C08L 33/16; C08L 55/02; C08L 75/06; C08L 25/14; C08L 33/08; C08L 27/12; C08F 220/22; C08F 220/16; C08F 2220/1891; B29C 45/0001
See application file for complete search history.

(56) References Cited

U.S. PATENT DOCUMENTS

2008/0045108 A1\* 2/2008 Masuda et al. ......... C08L 23/02
442/361
2010/0048846 A1 2/2010 Sugiyama et al.
2019/0062969 A1\* 2/2019 Masuda ............... D04H 1/4291

FOREIGN PATENT DOCUMENTS

JP 03-007745 A 1/1991
JP 2000-189345 A 7/2000
(Continued)

OTHER PUBLICATIONS

International Search Report for PCT/JP2017/008704, dated May 23, 2017.
(Continued)

*Primary Examiner* — Nathan M Nutter
(74) *Attorney, Agent, or Firm* — Sughrue Mion, PLLC

(57) ABSTRACT

Provided is a molded body of a resin composition, which has improved easy wiping-off properties and scratch resistance. This resin composition contains (1) a thermoplastic resin and (2) a fluorine-containing copolymer; and the fluorine-containing copolymer (2) is a copolymer which comprises (a) a repeating unit formed from a fluorine-containing monomer represented by formula $CH_2=C(-X)-C(=O)-Y-Z-Rf$, and (b) a repeating unit formed from a non-fluorine monomer having a hydrocarbon group with 14 or more carbon atoms, and which has a weight average molecular weight of 2,500-20,000.

16 Claims, No Drawings

(51) Int. Cl.
  *C08L 69/00* (2006.01)
  *C08L 75/04* (2006.01)
  *C08F 220/18* (2006.01)

(56) References Cited

FOREIGN PATENT DOCUMENTS

| | | |
|---|---|---|
| JP | 2006-37085 A | 2/2006 |
| JP | 2015-214640 A | 12/2015 |
| KR | 10-2010-0018502 A | 2/2010 |

OTHER PUBLICATIONS

International Preliminary Report on Patentability dated Sep. 20, 2018 from the International Bureau in counterpart International Application No. PCT/JP2017/008704.
Akesato, Hideaki et al., "Preparation of oil- and water-repellent moldings", Database CA [Online], Chemical Abstracts Services, Columbus, Ohio, US, (retrieved from STN on Sep. 19, 2019), Database accession No. 1991:609710, XP-002794415, total 3 pages.
Communication dated Oct. 14, 2019 from European Patent Office in corresponding EP Application No. 17763156.1.

* cited by examiner

RESIN COMPOSITION AND MOLDED BODY

This Application is a National Stage of International Application No. PCT/JP2017/008704 filed Mar. 6, 2017, claiming priority based on Japanese Patent Application Nos. 2016-048576 filed Mar. 11, 2016 and JP 2016-121933 filed Jun. 20, 2016.

TECHNICAL FIELD

The present invention relates to a resin composition comprising a thermoplastic resin and a fluorine-containing copolymer, and a molded body formed from the resin composition, wherein an ease of wiping-off stain and a scratch resistance are improved. The molded body is used in, for example, automobiles, home electricity products, various cases, buildings, electronic devices, drains, gasoline tanks and fuel hoses.

BACKGROUND ART

A molded body comprising a thermoplastic resin is used in various fields. In a living environment, it is difficult to prepare the state that there is no stain, and, importantly, it is difficult for the stain to be attached, or when a stain is attached, it is easy to get off the stain or to clean off. However, conventional cleaning methods of removing the stain have problems, for example, since the molded body is inferior to a detergent-proof property when the resin molded body is an acrylonitrile/butadiene/styrene resin (ABS resin), if repeatedly exposed to the detergent, a solvent crack will occur, and since the resin molded body is inferior to an abrasion resistance when the resin molded body is a polypropylene resin (PP resin), a crack is made on a surface at the time of wiping. Therefore, it is important for wiping with a dry cloth to be able to remove the stain and for the wiping to make no scratch.

JP 2000-189345A discloses a resin molded body (toilet seat) having a antifouling property and prepared by adding a lubricant, such as paraffin wax, to a matrix material resin. However, since the added lubricant is oleophilic, the antifouling property is not acquired to some kinds of stain.

JP 2006-37085A discloses a method of mixing a fluorine-containing copolymer with a thermoplastic resin to conduct a surface modification. However, only water- and oil-repellency specialized in alcohol repellency is exhibited as an effect, but other effects cannot be seen.

PRIOR ART DOCUMENT

Patent Document

Patent document 1: JP 2000-189345A
Patent document 2: JP 2006-37085A

SUMMARY OF THE INVENTION

Problem to be Solved by the Invention

An object of the present invention is to provide a molded product of a resin composition exhibiting an antifouling property for all stains, and having the improved wiping easiness and scratch resistance.

Means for Solving Problem

As a result of intensive study, we discovered that a specified resin composition exhibits special effects, it is easy to wipe off the stain when the stain is adhered, and a surface of the resin molded body is hardly scratched even when the surface of the resin molded body is rubbed.

The present invention relates to a resin composition comprising (1) a thermoplastic resin, and (2) a fluorine-containing copolymer.

The present invention provides a resin composition comprising:
(1) a thermoplastic resin, and
(2) a fluorine-containing copolymer,
wherein the fluorine-containing copolymer (2) is a copolymer which comprises:

(a) a repeating unit formed from a fluorine-containing monomer represented by the formula:

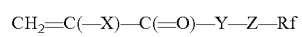

$$CH_2=C(-X)-C(=O)-Y-Z-Rf$$

wherein X is a hydrogen atom, a monovalent organic group or a halogen atom,
Y is —O— or —NH—,
Z is a direct bond or an divalent organic group, and
Rf is a fluoroalkyl group having 4 to 6 carbon atoms, and
(b) a repeating unit formed from a fluorine-free monomer containing a hydrocarbon group having at least 14 carbon atoms, and
which has a weight-average molecular weight of 2,500 to 20,000.

In addition, the present invention provides a molded body formed from said resin composition.

Further, the present invention provides a method of producing a molded body, comprising steps of:
(i) mixing a thermoplastic resin (1) with a fluorine-containing copolymer (2) to obtain a resin composition; and
(ii) molding the resin composition.

Effects of the Invention

The resin composition (antifouling resin composition) and the molded body according to the present invention exhibit an antifouling property to all the stains, and have excellent wiping-off ease and scratch resistance.

MODES FOR CARRYING OUT THE INVENTION (1) Thermoplastic Resin

The thermoplastic resin is at least one selected from the group consisting of a polypropylene resin, a polyethylene resin, a polyvinyl chloride resin, a polyurethane resin, a polystyrene resin, an acrylonitrile/butadiene/styrene resin (ABS resin), polyacetal resin (POM resin), an alloy of a polycarbonate resin and an acrylonitrile/butadiene/styrene resin (PC/ABS alloy), and a polycarbonate resin (PC resin). Preferable is the polypropylene resin, the polyethylene resin, the polyvinyl chloride resin and the polyurethane resin. Particularly preferable is the polypropylene resin.

Examples of the polypropylene resin are isotactic polypropylene, syndiotactic polypropylene, atactic polypropylene, and amorphous polypropylene.

The isotactic polypropylene is a highly crystalline polypropylene based on isotactic polypropylene prepared by a Ziegler-Natta catalyst or a metallocene catalyst.

The amorphous polypropylene is, for example, propylene having extremely low crystallinity prepared by using a metallocene catalyst. The amorphous polypropylene may be a mixture of polypropylene having extremely low crystallinity produced by using a metallocene catalyst, with other propylene. The amorphous polypropylene is available as, for example, TAFTHREN T-3512 and T-3522 manufactured by Sumitomo Chemical Co., Ltd., and L-MODU S-400, S-600 and S-901 manufactured by Idemitsu Kosan Co., Ltd.

In addition, the polypropylene resin may contain a structural unit derived from a monomer other than the propylene monomer. For example, mentioned are a structural unit derived from an ethylene monomer, a structural unit derived from an alpha-olefin monomer such as 1-butene, 1-hexene, 1-heptene, 1-octene, 4-methyl-1-pentene, 1-nonene and 1-decene, and a structural unit derived from a modifying agent to be described hereinafter.

Examples of the polypropylene resin include a propylene homopolymer, a propylene/ethylene random copolymer, a propylene/ethylene block copolymer, a propylene/butene random copolymer, a propylene/ethylene/butene random copolymer, a propylene/pentene random copolymer, a propylene/hexene random copolymer, a propylene/octene random copolymer, a propylene/ethylene/pentene random copolymer, a propylene/ethylene/hexene random copolymer and a modified product thereof. The term "random copolymer" means a copolymer prepared by randomly copolymerizing two or more monomers, for example, propylene and ethylene, and the term "block copolymer" means a polymer wherein, for example, an ethylene polymer or a propylene/ethylene polymer is dispersed in a propylene polymer.

The modified product can be obtained by a graft copolymerization of the polypropylene resin with a modifier, and obtained by copolymerizing a modifier with a main chain of the polypropylene resin. Examples of the modifier include unsaturated dicarboxylic acids such as maleic acid, citraconic acid, halogenated maleic acid, itaconic acid, cis-4-cyclohexene-1,2-dicarboxylic acid, endo-cis-bicyclo[2.2.1]-5-heptene-2,3-dicarboxylic acid; unsaturated dicarboxylic acid esters, amides or imides; unsaturated dicarboxylic acid anhydrides such as maleic anhydride, citraconic anhydride, halogenated maleic anhydride, itaconic anhydride, cis-4-cyclohexene-1,2-dicarboxylic acid anhydride and endo-cis-bicyclo[2.2.1]-5-heptene-2,3-dicarboxylic acid anhydride; unsaturated monocarboxylic acids such as acrylic acid, methacrylic acid and crotonic acid; unsaturated monocarboxylic acid esters (for example, methyl acrylate, ethyl acrylate, methyl methacrylate, ethyl methacrylate), amides and imides. The polypropylene resin is preferably not modified.

Among them, a propylene homopolymer, a propylene/ethylene random copolymer and a propylene/ethylene block copolymer are preferable. The propylene homopolymer and the propylene/ethylene block copolymer are more preferable. The propylene/ethylene block copolymer is particularly preferable.

The polypropylene resin may be one or a combination of at least two.

Examples of the polyethylene resin are high-density polyethylene, low-density polyethylene, and linear low-density polyethylene The polyvinyl chloride resin is a polymer comprising vinyl chloride as a main monomer (the amount of vinyl chloride is at least 70% by weight, based on the polyvinyl chloride). Examples of polyvinyl chloride are a homopolymer of vinyl chloride, and a copolymer of vinyl chloride and various copolymerizable monomers.

The polyurethane resin can be produced by reacting a diisocyanate with a polyol. The polyurethane resin may be thermosetting, or may be thermoplastic.

In the case of the thermosetting resin, a trifunctional or more isocyanate compound, or a compound having three or more hydroxyl groups in molecule is partially used.

In the case of the thermoplastic resin, a diisocyanate compound and a compound having two hydroxyl groups in molecule are mainly polymerized.

Examples of the diisocyanate compound include aromatic diisocyanates such as tolylene diisocyanate (TDI), m-xylylene diisocyanate (MDI), diphenylmethane-4,4'-diisocyanate, diphenyl ether-4,4'-diisocyanate and 1,5-naphthalene diisocyanate; and aliphatic diisocyanates such as hexamethylene diisocyanate, isophorone diisocyanate, hydrogenated TDI and hydrogenated MDI.

Examples of the compound having two hydroxyl groups in molecule includes polyether-based glycols such as polyethylene glycol, polypropylene glycol, polyethylene/propylene glycol and polytetramethylene glycol; ester-based glycols such as a caprolactone-based glycol, an adipate-based glycol and a copolyester-based glycol; carbonate-based glycols; aliphatic glycols such as ethylene glycol, 1,3-propane glycol, 1,4-butanediol and 1, 6-hexane glycol; and aromatic ring-containing glycols such as bisphenol A, an ethylene oxide adduct of bisphenol A and a propylene oxide adduct of bisphenol A.

The polyurethane having a hardness measured according to a JIS-A method (JIS K6253) of at least 70, preferably at least 80 is particularly suitable for the present invention. If the hardness is less than 70, a sheet may be too soft and may not be preferable from the viewpoint of scratch resistance.

The polyurethane sheet can be prepared by a cast molding method or an extrusion molding method. In the case of the cast molding method, a mixture of the isocyanate and the compound having hydroxyl groups are is injected between plates to conduct a polymerization molding, or the mixture is cast in a sheet-like form to conduct a polymerization molding. In the latter method, a solvent can be used, and the solvent is removed after casting in a sheet shape Also applied is a solution casting method in which a polymer solution obtained by dissolving an existing polymer in a solvent is casted and the solvent is removed to give a sheet shape. In the case of a solvent having a relatively high boiling point such as dimethylformamide, a wet method is often applied. The cast molding method is suitable for obtaining a uniform sheet.

The extrusion molding method can be applied to the thermoplastic polyurethane. A sheet can be obtained at a low cost, but an optical anisotropy may be increased or appearance uniformity may be inferior. Examples of polystyrene resins are atactic polystyrene and syndiotactic polystyrene.

The acrylonitrile/butadiene/styrene resin (ABS resin) may be a resin obtained by any of a graft method and a polymer blend method.

The polyacetal resin (POM resin) may be any of a homopolymer of formaldehyde, and a copolymer of a formaldehyde and a monomer having an oxyethylene structure.

The alloy of a polycarbonate resin and an acrylonitrile/butadiene/styrene resin (a PC/ABS alloy) can be obtained by using a compatibilizing agent, or by performing a block polymerization or a graft polymerization. The PC/ABS alloy may be a polymer blend.

The polycarbonate resin (PC resin) can be produced by reacting bisphenol A with phosgene. The production may be conducted by using diphenyl carbonate or carbonyl chloride.

In the present invention, the thermoplastic resin may be one or a combination of at least two.

(2) Fluorine-Containing Copolymer

The fluorine-containing copolymer (2) is a copolymer having a repeating unit formed from the fluorine-containing monomer (a) and a repeating unit formed from the fluorine-free monomer (b). The fluorine-containing monomer (a) is a monomer containing a fluoroalkyl group having 4 to 6 carbon atoms. The fluorine-free monomer (b) is a monomer containing a non-cyclic or cyclic hydrocarbon group having at least 14 carbon atoms, which may contain a nitrogen, oxygen and/or sulfur atom. The fluorine-containing copolymer (2) may have a repeating unit formed from another monomer (c) other than the fluorine-containing monomer (a) and the fluorine-free monomer (b).

The fluorine-containing monomer (a) is a monomer of the formula:

$$CH_2=C(-X)-C(=O)-Y-Z-Rf$$

wherein X is a hydrogen atom, a monovalent organic group or a halogen atom,
Y is —O— or —NH—,
Z is a direct bond or an divalent organic group, and
Rf is a fluoroalkyl group having 4 to 6 carbon atoms.

X is, for example, a hydrogen atom, a methyl group, a halogen atom, a linear or branched alkyl group having 2 to 21 carbon atoms, a $CFX^1X^2$ group (where each of $X^1$ and $X^2$ is a hydrogen atom, a fluorine atom, a chlorine atom, a bromine atom or an iodine atom), a cyano group, a linear or branched fluoroalkyl group having 1 to 21 carbon atoms, a substituted or unsubstituted benzyl group or a substituted or unsubstituted phenyl group.

In the fluorine-containing copolymer of the present invention, X is preferably a hydrogen atom, a methyl group, a fluorine atom, or a chlorine atom. X is more preferably a methyl group, since excellent easiness of wiping-off is obtained.

Y is preferably —O—.

Z is, for example, a direct bond,
a linear alkylene group or branched alkylene group having 1-20 carbon atoms, such as a group represented by the formula $-(CH_2)_x-$ wherein x is 1 to 10, a group represented by the formula $-SO_2N(R^1)R^2-$ or the formula $-CON(R^1)R^2-$ wherein $R^1$ is an alkyl group having 1 to 10 carbon atoms and $R^2$ is a linear alkylene group or branched alkylene group having 1 to 10 carbon atoms, a group represented by the formula $-CH_2CH(OR^3)CH_2-$ wherein $R^3$ is a hydrogen atom or an acyl group having 1 to 10 carbon atoms (for example, a formyl group or an acetyl group),
a group represented by the formula $-Ar-(CH_2)_r-$ wherein Ar is an arylene group optionally having a substituent group, and r is 0 to 10, or
a $-(CH_2)_m-SO_2-(CH_2)_n-$ group or a $-(CH_2)_m-S-(CH_2)_n-$ group wherein m is 1-10, and n is 0-10.

In the fluorine-containing copolymer of the present invention, Z is preferably a direct bond, an alkylene group having 1-20 carbon atoms, or $-SO_2N(R^1)R^2-$, particularly preferably $-(CH_2)_2-$.

The Rf group is preferably a perfluoroalkyl group, but may be a fluoroalkyl group having a hydrogen atom. The carbon number of the Rf group is preferably 4 or 6. The carbon number of the Rf group is particularly preferably 6. Examples of the Rf group include $-CF_2CF_2CF_2CF_3$, $-CF_2CF(CF_3)_2$, $-C(CF_3)_3$, $-(CF_2)_5CF_3$ and $-(CF_2)_3CF(CF_3)_2$.

Specific examples of the fluorine-containing monomer (a) include, but are not limited to, the followings:

$CH_2=C(-H)-C(=O)-O-(CH_2)_2-Rf$
$CH_2=C(-H)-C(=O)-O-C_6H_4-Rf$
$CH_2=C(-Cl)-C(=O)-O-(CH_2)_2-Rf$
$CH_2=C(-H)-C(=O)-O-(CH_2)_2N(-CH_3)SO_2-Rf$
$CH_2=C(-H)-C(=O)-O-(CH_2)_2N(-C_2H_5)SO_2-Rf$
$CH_2=C(-H)-C(=O)-O-CH_2CH(-OH)CH_2-Rf$
$CH_2=C(-H)-C(=O)-O-CH_2CH(-OCOCH_3)CH_2-Rf$
$CH_2=C(-H)-C(=O)-O-(CH_2)_2-S-Rf$
$CH_2=C(-H)-C(=O)-O-(CH_2)_2-S-(CH_2)_2-Rf$
$CH_2=C(-H)-C(=O)-O-(CH_2)_3-SO_2-Rf$
$CH_2=C(-H)-C(=O)-O-(CH_2)_2-SO_2-(CH_2)_2-Rf$
$CH_2=C(-H)-C(=O)-NH-(CH_2)_2-Rf$
$CH_2=C(-CH_3)-C(=O)-O-(CH_2)_2-Rf$
$CH_2=C(-CH_3)-C(=O)-O-C_6H_4-Rf$
$CH_2=C(-CH_3)-C(=O)-O-(CH_2)_2N(-CH_3)SO_2-Rf$
$CH_2=C(-CH_3)-C(=O)-O-(CH_2)_2N(-C_2H_5)SO_2-Rf$
$CH_2=C(-CH_3)-C(=O)-O-CH_2CH(-OH)CH_2-Rf$
$CH_2=C(-CH_3)-C(=O)-O-CH_2CH(-OCOCH_3)CH_2-Rf$
$CH_2=C(-CH_3)-C(=O)-O-(CH_2)_2-S-Rf$
$CH_2=C(-CH_3)-C(=O)-O-(CH_2)_2-S-(CH_2)_2-Rf$
$CH_2=C(-CH_3)-C(=O)-O-(CH_2)_3-SO_2-Rf$
$CH_2=C(-CH_3)-C(=O)-O-(CH_2)_2-SO_2-(CH_2)_2-Rf$
$CH_2=C(-CH_3)-C(=O)-NH-(CH_2)_2-Rf$
$CH_2=C(-F)-C(=O)-O-(CH_2)_2-S-Rf$
$CH_2=C(-F)-C(=O)-O-(CH_2)_2-S-(CH_2)_2-Rf$
$CH_2=C(-F)-C(=O)-O-(CH_2)_2-SO_2-Rf$
$CH_2=C(-F)-C(=O)-O-(CH_2)_2-SO_2-(CH_2)_2-Rf$
$CH_2=C(-F)-C(=O)-NH-(CH_2)_2-Rf$
$CH_2=C(-Cl)-C(=O)-O-(CH_2)_2-S-Rf$
$CH_2=C(-Cl)-C(=O)-O-(CH_2)_2-S-(CH_2)_2-Rf$
$CH_2=C(-Cl)-C(=O)-O-(CH_2)_2-SO_2-Rf$
$CH_2=C(-Cl)-C(=O)-O-(CH_2)_2-SO_2-(CH_2)_2-Rf$
$CH_2=C(-Cl)-C(=O)-NH-(CH_2)_2-Rf$
$CH_2=C(-CF_3)-C(=O)-O-(CH_2)_2-S-Rf$
$CH_2=C(-CF_3)-C(=O)-O-(CH_2)_2-S-(CH_2)_2-Rf$
$CH_2=C(-CF_3)-C(=O)-O-(CH_2)_2-SO_2-Rf$
$CH_2=C(-CF_3)-C(=O)-O-(CH_2)_2-SO_2-(CH_2)_2-Rf$
$CH_2=C(-CF_3)-C(=O)-NH-(CH_2)_2-Rf$
$CH_2=C(-CF_2H)-C(=O)-O-(CH_2)_2-S-Rf$
$CH_2=C(-CF_2H)-C(=O)-O-(CH_2)_2-S-(CH_2)_2-Rf$
$CH_2=C(-CF_2H)-C(=O)-O-(CH_2)_2-SO_2-Rf$
$CH_2=C(-CF_2H)-C(=O)-O-(CH_2)_2-SO_2-(CH_2)_2-Rf$
$CH_2=C(-CF_2H)-C(=O)-NH-(CH_2)_2-Rf$
$CH_2=C(-CN)-C(=O)-O-(CH_2)_2-S-Rf$
$CH_2=C(-CN)-C(=O)-O-(CH_2)_2-S-(CH_2)_2-Rf$
$CH_2=C(-CN)-C(=O)-O-(CH_2)_2-SO_2-Rf$
$CH_2=C(-CN)-C(=O)-O-(CH_2)_2-SO_2-(CH_2)_2-Rf$
$CH_2=C(-CN)-C(=O)-NH-(CH_2)_2-Rf$
$CH_2=C(-CF_2CF_3)-C(=O)-O-(CH_2)_2-S-Rf$
$CH_2=C(-CF_2CF_3)-C(=O)-O-(CH_2)_2-S-(CH_2)_2-Rf$
$CH_2=C(-CF_2CF_3)-C(=O)-O-(CH_2)_2-SO_2-Rf$

CH$_2$=C(—CF$_2$CF$_3$)—C(=O)—O—(CH$_2$)$_2$—SO$_2$—(CH$_2$)$_2$—Rf
CH$_2$=C(—CF$_2$CF$_3$)—C(=O)—NH—(CH$_2$)$_2$—Rf
CH$_2$=C(—F)—C(=O)—O—(CH$_2$)$_3$—S—Rf
CH$_2$=C(—F)—C(=O)—O—(CH$_2$)$_3$—S—(CH$_2$)$_2$—Rf
CH$_2$=C(—F)—C(=O)—O—(CH$_2$)$_3$—SO$_2$—Rf
CH$_2$=C(—F)—C(=O)—O—(CH$_2$)$_3$—SO$_2$—(CH$_2$)$_2$—Rf
CH$_2$=C(—F)—C(=O)—NH—(CH$_2$)$_3$—Rf
CH$_2$=C(—Cl)—C(=O)—O—(CH$_2$)$_3$—S—Rf
CH$_2$=C(—Cl)—C(=O)—O—(CH$_2$)$_3$—S—(CH$_2$)$_2$—Rf
CH$_2$=C(—Cl)—C(=O)—O—(CH$_2$)$_3$—SO$_2$—Rf
CH$_2$=C(—Cl)—C(=O)—O—(CH$_2$)$_3$—SO$_2$—(CH$_2$)$_2$—Rf
CH$_2$=C(—CF$_3$)—C(=O)—O—(CH$_2$)$_3$—S—Rf
CH$_2$=C(—CF$_3$)—C(=O)—O—(CH$_2$)$_3$—S—(CH$_2$)$_2$—Rf
CH$_2$=C(—CF$_3$)—C(=O)—O—(CH$_2$)$_3$—SO$_2$—Rf
CH$_2$=C(—CF$_3$)—C(=O)—O—(CH$_2$)$_3$—SO$_2$—(CH$_2$)$_2$—Rf
CH$_2$=C(—CF$_2$H)—C(=O)—O—(CH$_2$)$_3$—S—Rf
CH$_2$=C(—CF$_2$H)—C(=O)—O—(CH$_2$)$_3$—S—(CH$_2$)$_2$—Rf
CH$_2$=C(—CF$_2$H)—C(=O)—O—(CH$_2$)$_3$—SO$_2$—Rf
CH$_2$=C(—CF$_2$H)—C(=O)—O—(CH$_2$)$_3$—SO$_2$—(CH$_2$)$_2$—Rf
CH$_2$=C(—CN)—C(=O)—O—(CH$_2$)$_3$—S—Rf
CH$_2$=C(—CN)—C(=O)—O—(CH$_2$)$_3$—S—(CH$_2$)$_2$—Rf
CH$_2$=C(—CN)—C(=O)—O—(CH$_2$)$_3$—SO$_2$—Rf
CH$_2$=C(—CN)—C(=O)—O—(CH$_2$)$_3$—SO$_2$—(CH$_2$)$_2$—Rf
CH$_2$=C(—CF$_2$CF$_3$)—C(=O)—O—(CH$_2$)$_3$—S—Rf
CH$_2$=C(—CF$_2$CF$_3$)—C(=O)—O—(CH$_2$)$_3$—S—(CH$_2$)$_2$—Rf
CH$_2$=C(—CF$_2$CF$_3$)—C(=O)—O—(CH$_2$)$_3$—SO$_2$—Rf
CH$_2$=C(—CF$_2$CF$_3$)—C(=O)—O—(CH$_2$)$_2$—SO$_2$—(CH$_2$)$_2$—Rf wherein Rf is a fluoroalkyl group having 4 to 6 carbon atoms.

The fluorine-containing copolymer has the repeating unit formed from the fluorine-free monomer (b) in addition to the repeating unit formed from the fluorine-containing monomer (a).

The fluorine-free monomer (b) is a monomer which contains a hydrocarbon group (a non-cyclic hydrocarbon group or a cyclic hydrocarbon group) having at least 14 carbon atoms. The lower limit of the number of carbon atoms may be 16 or 17. The upper limit of the number of carbon atoms of the hydrocarbon group may be 30, for example 25, particularly 20.

The fluorine-free monomer (b) is preferably a (meth) acrylate. The fluorine-free monomer (b) is preferably a (meth)acrylate ester wherein an acryloyloxy group is bonded to a monovalent hydrocarbon group. Particularly preferably, the fluorine-free monomer (b) is an acrylate ester in which an alpha-position is a hydrogen atom.

The fluorine-free monomer (b) may be a fluorine-free non-crosslinkable monomer (b1).

A specific example of the fluorine-free non-crosslinkable monomer (b1) may be a compound of the formula:

CH$_2$=CA-T wherein A is a hydrogen atom, a methyl group, or a halogen atom other than a fluorine atom (for example, a chlorine atom, a bromine atom, and an iodine atom), T is a hydrocarbon group having 14 to 30 carbon atoms, or an organic group having 15 to 31 carbon atoms and an ester bond.

Examples of the hydrocarbon group having 14-30 carbon atoms are a linear or branched saturated or unsaturated (for example, ethylenically unsaturated) aliphatic hydrocarbon group having 14 to 30 carbon atoms, a saturated or unsaturated (for example, ethylenically unsaturated) cycloaliphatic hydrocarbon group having 14 to 30 carbon atoms, an aromatic hydrocarbon group having 14-30 carbon atoms, and an araliphatic hydrocarbon group having 14-30 carbon atoms.

Examples of the organic group having 15 to 31 carbon atoms and an ester bond are: —C(=O)—O-Q and —O—C(=O)-Q wherein Q is a linear or branched saturated or unsaturated (for example, ethylenically unsaturated) aliphatic hydrocarbon group having 14 to 30 carbon atoms, a saturated or unsaturated (for example, ethylenically unsaturated) cycloaliphatic hydrocarbon group having 14 to 30 carbon atoms, an aromatic hydrocarbon group having 14-30 carbon atoms, or an araliphatic hydrocarbon group having 14-30 carbon atoms.

The fluorine-free non-crosslinkable monomer (b1) may be a (meth)acrylate ester monomer.

Examples of the (meth)acrylate ester monomer may be a compound represented by the formula:

CH$_2$=CA$^{21}$-C(=O)—O-A$^{22}$ wherein A$^{21}$ is a hydrogen atom, an organic group, a halogen atom other than a fluorine atom, and A$^{22}$ is a hydrocarbon group having 14-30 carbon atoms.

A$^{21}$ is preferably a hydrogen atom, a methyl group or a chlorine atom.

A$^{22}$ (hydrocarbon group) may be a non-cyclic hydrocarbon group having 14 to 30 carbon atoms and a cyclic hydrocarbon group having 14 to 30 carbon atoms. A$^{22}$ (hydrocarbon group) is preferably a non-cyclic hydrocarbon group, particularly a chain hydrocarbon group having 14 to 30 carbon atoms.

Specific examples of the (meth)acrylate ester monomer having a non-cyclic hydrocarbon group include cetyl (meth) acrylate, stearyl (meth)acrylate and behenyl (meth)acrylate.

The fluorine-containing copolymer according to the present invention may consist of the fluorine-containing monomer (a) and the fluorine-free monomer (b) or may comprise another monomer (c) other than the fluorine-containing monomer (a) and the fluorine-free monomer (b). The other monomer (c) is preferably free from a fluorine atom. Examples of the other monomer (c) are (c1) a fluorine-free crosslinkable monomer or (c2) a halogenated olefin monomer.

The fluorine-free crosslinkable monomer (c1) is a monomer free from a fluorine atom. The fluorine-free crosslinkable monomer may be a fluorine-free compound having at least one reactive group and/or olefinic carbon-carbon double bond (preferably a (meth)acrylate group). The fluorine-free crosslinkable monomer may be a compound which has at least two olefinic carbon-carbon double bonds (preferably (meth)acrylate groups) or a compound which has at least one olefinic carbon-carbon double bond and at least one reactive group. Examples of the reactive group include a hydroxyl group, an epoxy group, a chloromethyl group, a blocked isocyanate group, an amino group, a carboxyl group and a glycidyl group.

The fluorine-free crosslinkable monomer may be a mono (meth)acrylate, di(meth)acrylate, or mono(meth)acrylamide having a reactive group. Alternatively, the fluorine-free crosslinkable monomer may be di(meth)acrylate.

Examples of the fluorine-free crosslinkable monomer include, but are not limited to, diacetone(meth)acrylamide, N-methylol(meth)acrylamide, hydroxymethyl (meth)acrylate, 2-hydroxyethyl (meth)acrylate, 2,3-dihydroxypropyl (meth)acrylate, 3-chloro-2-hydroxypropyl (meth)acrylate, 2-acetoacetoxyethyl (meth)acrylate, butadiene, isoprene, chloroprene, monochlorovinyl acetate, vinyl methacrylate, glycidyl (meth)acrylate, 1,4-butanediol di(meth)acrylate, 1,6-hexanediol di(meth)acrylate, 1,9-nonanediol di(meth)acrylate, and neopentylglycol di(meth)acrylate.

The fluorine-free crosslinkable monomer may be, for example, an isocyanatoacrylate monomer. Specific examples of the isocyanatoacrylate monomer include 2-isocyanatoethyl (meth)acrylate, 3-isocyanatopropyl (meth)acrylate, 4-isocyanatobutyl (meth)acrylate, 2-butanone oxime adduct of 2-isocyanatoethyl (meth)acrylate, a pyrazole adduct of 2-isocyanatoethyl (meth)acrylate, 3,5-dimethylpyrazole adduct of 2-isocyanatoethyl (meth)acrylate, a 3-methylpyrazole adduct of 2-isocyanatoethyl (meth)acrylate, an epsilon-caprolactam adduct of 2-isocyanatoethyl (meth)acrylate, 2-butanone oxime adduct of 3-isocyanatopropyl (meth)acrylate, a pyrazole adduct of 3-isocyanatopropyl (meth)acrylate, 3,5-dimethylpyrazole adduct of 3-isocyanatopropyl (meth)acrylate, a 3-methylpyrazole adduct of 3-isocyanatopropyl (meth)acrylate, an epsilon-caprolactam adduct of 3-isocyanatopropyl (meth)acrylate, 2-butanone oxime adduct of 4-isocyanatobutyl (meth)acrylate, a pyrazole adduct of 4-isocyanatobutyl (meth)acrylate, 3,5-dimethylpyrazole adduct of 4-isocyanatobutyl (meth)acrylate, a 3-methylpyrazole adduct of 4-isocyanatobutyl (meth)acrylate, and an epsilon-caprolactam adduct of 4-isocyanatobutyl (meth)acrylate.

The halogenated olefin monomer (c2) is a monomer free from a fluorine atom.

The halogenated olefin monomer may be an olefin having 2-20 carbon atoms and substituted by 1-10 chlorine atoms, bromine atoms or iodine atoms. Preferably, the halogenated olefin monomer is a chlorinated olefin having 2-20 carbon atoms, particularly an olefin having 2-5 carbon atoms and having 1-5 chlorine atoms. Preferable examples of the halogenated olefin monomer are a vinyl halide such as vinyl chloride, vinyl bromide and vinyl iodide, and a vinylidene halide such as vinylidene chloride, vinylidene bromide and vinylidene iodide. Vinyl chloride and vinylidene chloride are preferable because of high scratch resistance.

The term "(meth)acrylate" as used herein means an acrylate or methacrylate, and the term "(meth)acrylamide" as used herein means an acrylamide or methacrylamide.

Each of the monomers (a)-(c) may be used one alone or in a combination of at least two. The fluorine-containing copolymers (2) may be one alone or in a combination of at least two.

The fluorine-containing copolymer (2) of the present invention is preferably free from a repeating unit formed from a fluorine-free monomer containing a hydrocarbon group having at most 13 carbon atoms, for example, a (meth)acrylate ester containing a hydrocarbon group having at most 13 carbon atoms, particularly a (meth)acrylate ester containing a non-cyclic hydrocarbon group having at most 13 carbon atoms. For example, the fluorine-containing copolymer (2) of the present invention is preferably free from a repeat unit formed from lauryl acrylate. High water- and oil-repellency is obtained by being free from these repeat units.

A weight ratio of the fluorine-containing monomer (a) to the fluorine-free monomer (b) in the fluorine-containing copolymer (2) is preferably 35:65 to 70:30, more preferably 40:60 to 60:40, particularly 42.5:57.5 to 58:42. The amount of the fluorine-containing monomer (a) may be at least 25% by weight, for example, at least 35% by weight, particularly 35 to 60% by weight, based on the fluorine-containing copolymer.

The amount of the monomer (c) may be at most 100 parts by weight, for example, 0.1 to 30 parts by weight, particularly 1 to 20 parts by weight, based on 100 parts by weight of the total of the monomer (a) and the monomer (b).

The weight-average molecular weight of the fluorine-containing polymer may be 2,500 to 20,000, preferably 3,000 to 15,000, for example, 5,000 to 12,000 in terms of polystyrene, as measured by GPC (gel permeation chromatography).

The polymer of the present invention may be a random copolymer or a block copolymer, but is generally a random copolymer.

The amount of the fluorine-containing copolymer (2) may be 0.01 to 50 parts by weight, preferably 0.1 to 20 parts by weight, particularly 0.2 to 10 parts by weight, for example, 1.0 to 8 parts by weight, more preferably 1.2 to 5.0 parts by weight, based on 100 parts by weight of the thermoplastic resin (1).

The fluorine-containing copolymer may be obtained by polymerizing by a known method using a polymerization initiator, a solvent, and optionally a chain transfer agent.

The fluorine-containing copolymer and the fluorine-free polymer in the present invention can be produced by any of conventional polymerization methods and the polymerization condition can be optionally selected. The polymerization method includes, for example, a solution polymerization, a suspension polymerization and an emulsion polymerization.

In the solution polymerization, there can be used a method of dissolving the monomer(s) into an organic solvent in the presence of a polymerization initiator, replacing the atmosphere by nitrogen, and stirring the mixture with heating at the temperature within the range from 30° C. to 120° C. for 1 hour to 10 hours. Examples of the polymerization initiator include azobisisobutyronitrile, benzoyl peroxide, di-tert-butyl peroxide, lauryl peroxide, cumene hydroperoxide, t-butyl peroxypivalate and diisopropyl peroxydicarbonate. The polymerization initiator may be used in the amount within the range from 0.01 to 20 parts by weight, for example, from 0.01 to 10 parts by weight, based on 100 parts by weight of total of the monomers.

The organic solvent is inert to the monomer, and dissolves the monomer, and examples of the organic solvent include an ester (for example, an ester having 2-30 carbon atoms, specifically ethyl acetate and butyl acetate), a ketone (for example, a ketone of 2-30 carbon atoms, specifically methyl ethyl ketone and diisobutyl ketone), and an alcohol (for example, an alcohol having 1-30 carbon atoms, specifically isopropyl alcohol). Specific examples of the organic solvent include acetone, chloroform, HCHC225, isopropyl alcohol, pentane, hexane, heptane, octane, cyclohexane, benzene, toluene, xylene, petroleum ether, tetrahydrofuran, 1,4-dioxane, methyl ethyl ketone, methyl isobutyl ketone, diisobutyl ketone, ethyl acetate, butyl acetate, 1,1,2,2-tetrachloroethane, 1,1,1-trichloroethane, trichloroethylene, perchloroethylene, tetrachlorodifluoroethane and trichlorotrifluoroethane. The organic solvent may be used in the amount within the range from 10 to 2,000 parts by weight, for example, from 50 to 1,000 parts by weight, based on 100 parts by weight of total of the monomers.

In the emulsion polymerization, there can be used a method of emulsifying monomers in water in the presence of a polymerization initiator and an emulsifying agent, replacing the atmosphere by nitrogen, and polymerizing with stirring, for example, at the temperature within the range from 50° C. to 80° C. for 1 hour to 10 hours. As the polymerization initiator, for example, water-soluble initiators such as benzoyl peroxide, lauroyl peroxide, t-butyl perbenzoate, 1-hydroxycyclohexyl hydroperoxide, 3-carboxypropionyl peroxide, acetyl peroxide, azobisisobutylamidine dihydrochloride, azobisisobutyronitrile, sodium peroxide, potassium persulfate and ammonium persulfate and oil-soluble initiators such as azobisisobutyronitrile, benzoyl peroxide, di-tert-butyl peroxide, lauryl peroxide, cumene hydroperoxide, t-butyl peroxypivalate and diisopropyl peroxydicarbonate can be used. The polymerization initiator may be used in the amount within the range from 0.01 to 10 parts by weight, based on 100 parts by weight of the monomers.

In order to obtain a polymer dispersion in water, which is superior in storage stability, it is preferable that the monomers are dispersed in water by using an emulsifying device capable of applying a strong shearing energy (e.g., a high-pressure homogenizer and an ultrasonic homogenizer) and then polymerized.

As the emulsifying agent, various emulsifying agents such as an anionic emulsifying agent, a cationic emulsifying agent and a nonionic emulsifying agent can be used in the amount within the range from 0.5 to 20 parts by weight, based on 100 parts by weight of the monomers. The anionic emulsifying agent and/or the cationic emulsifying agent and/or the nonionic emulsifying agent are preferable. When the monomers are not completely compatibilized, a compatibilizing agent capable of sufficiently compatibilizing them (e.g., a water-soluble organic solvent and a low-molecular weight monomer) is preferably added to these monomers. By the addition of the compatibilizing agent, the emulsifiability and polymerizability can be improved.

Examples of the water-soluble organic solvent include acetone, methyl ethyl ketone, ethyl acetate, propylene glycol, dipropylene glycol monomethyl ether, dipropylene glycol, tripropylene glycol and ethanol. The water-soluble organic solvent may be used in the amount within the range from 1 to 50 parts by weight, e.g., from 10 to 40 parts by weight, based on 100 parts by weight of water. Examples of the low-molecular weight monomer are methyl methacrylate, glycidyl methacrylate, 2,2,2-trifluoroethyl methacrylate. The low-molecular weight monomer may be used in the amount within the range from 1 to 50 parts by weight, e.g., from 10 to 40 parts by weight, based on 100 parts by weight of total of monomers.

A chain transfer agent may be used in the polymerization. The molecular weight of the polymer can be changed according to the amount of the chain transfer agent used. Examples of the chain transfer agent include a mercaptan group-containing compound (particularly an alkyl mercaptan (for example, having 1-30 carbon atoms)), such as lauryl mercaptan, thioglycol, and thioglycerol, and an inorganic salt such as sodium hypophosphite and sodium hydrogen sulfite. The amount of the chain transfer agent may be within the range from 0.01 to 10 parts by weight, for example, from 0.1 to 5 parts by weight, based on 100 parts by weight of total of the monomers.

A liquid medium is removed from a liquid (solution or dispersion) containing the fluorine-containing copolymer to obtain the fluorine-containing copolymer. For example, a dispersion of fluorine-containing copolymer (an aqueous dispersion or an organic solvent-dispersion) can be precipitated into water or an organic solvent, and dried to obtain the fluorine-containing copolymer.

The resin composition may consist of the thermoplastic resin (1) and the fluorine-containing copolymer (2), or may comprise another component. Examples of the other component include additives (that is, auxiliary agents) such as a dye, a pigment, an antistatic agent, an antioxidant, a light stabilizer, an ultraviolet light-absorbing agent, a neutralizing agent, a nucleating agent, an epoxy stabilizer, a lubricant, an antibacterial agent, a flame retardant and plasticizer.

The molded body can be produced by a production method comprising steps of:
(i) mixing the thermoplastic resin (1) with the fluorine-containing copolymer (2) to obtain a resin composition, and
(ii) molding the resin composition.

The steps (i) and (ii) may be conducted simultaneously.

The melt-kneading is preferably conducted at a melt temperature of 160-300° C., preferably 180-280° C., by using, for example, an extruder to produce the molded body.

The resin composition according to the present invention can be obtained by mixing (for example, melt-kneading) the thermoplastic resin (1) with the fluorine-containing copolymer (2). Generally, the molded body can produced by heating the thermoplastic resin (1) and the fluorine-containing copolymer (2) at a temperature of 100-320° C., for example, 150-300° C. Generally, the thermoplastic resin (1) and the fluorine-containing copolymer (2) are mutually compatible in a molten state. The mixing can be performed, for example by conventionally well-known methods, such as a single screw extruder, a twin screw extruder and a roll. The resin composition obtained in this way is molded by, for example, an extrusion molding, an injection molding, a compression molding, a blow molding and a press. The resin composition is molded to give the molded bodies having various shapes. The obtained molded body may be further heat-treated with, for example, an oven and a drying furnace, after molding. The molded body may be a monolayer or may have two layers to ten layers, for example, three layers to five layers.

The molded body of the present invention can be used in applications where a thermoplastic resin is used, particularly in the applications where excellent easiness of wiping-off stains and excellent scratch resistance are required. Applications of the molded body include an automobile (an exterior component and an interior component) (for example, a bumper, an instrumental panel and a door trim), and a home electric appliance (for example, a washing machine and a refrigerator) (for example, a housing, and a door, a tray and a vegetable chamber in a refrigerator), various cases, a building (interior and parts) (for example, handrail, a wall paper, a desk, a chair, a toilet seat, a toilet seat cover and a bathtub), and an electronic apparatus (for example, a housing of a smart phone), a drain ditch, a pipe, a tableware, a flooring material, a gasoline tank, a fuel hose, and an OA apparatus. Among them, interior parts of the automobile, interior parts of the home electric appliance, and the building are more preferable.

The molded body of the present invention can exhibit excellent liquid repellency to a detergent to prevent adhesion. Therefore, the molded body can be used in applications in which an appearance is deteriorated and a function is lowered due to the adhesion of the detergent. The applications of the molded body include a home electric appliance (for example, an interior component such as a washing tank of a washing machine and a detergent input port, an interior part such as a door, a tank and a nozzle in a dish washer, and an interior part of a dryer), a handrail, a wall paper, a desk, a chair, a toilet seat, and a toilet seat cover, a drain ditch, a pipe, a dish, and a floor material. The home electric appliance, particularly a component of the home electric appliance (for example, an interior component) is preferable.

EXAMPLES

Hereinafter, the present invention will be illustrated in detail by the following Examples, which do not limit the present invention.

In the following Examples, parts and % are parts by weight and % by weight, unless otherwise specified.

Properties were measured in the following manner.

Weight-Average Molecular Weight of Fluorine-Containing Polymer

A fluorine-containing polymer (0.1 g) and tetrahydrofuran (THF) (19.9 g) were mixed and then filtered by a filter after standing for one hour to prepare a THF solution of the fluorine-containing polymer. This sample was measured by a gel permeation chromatograph (GPC) set to the following device and condition. Instrument: SHODEX GPC-104 (manufactured by SHOWA DENKO K. K.)

Column:

Sample side: GPC LF-G, GPC LF604, GPC LF604, GPC KF601 and GPC KF601 (all manufactured by SHOWA DENKO K. K.) were connected in this order.

Reference side: GPC KF600RL, GPC KF600RL, GPC KF600RH and GPC KF600RH (all manufactured by SHOWA DENKO K. K.) were connected in this order.

Mobile phase: THF

Mobile phase flow rate: 0.6 mL/min in both sample side and reference side

Column temperature: 40° C.

Detector: Differential refractometer (RI)

Oil-Repellency

A contact angle of oleic acid was measured at room temperature (25° C.) for each test piece. A droplet amount at the time of measurement was 2 μL.

Friction Coefficient

A test piece was tested by a surface measuring instrument with using a steel ball as a friction element to measure a static friction coefficient, according to ASTM D1894.

Antifouling Property 0.1 ml of each test solution was dropped on a test piece, and dried at room temperature (25° C.) for a half-day and then wiped once with a cloth. A degree of remaining stain after the wiping was determined by visual observation.

An antifouling property was evaluated as follows.

| | Antifouling property |
|---|---|
| Excellent | Can be wiped off with a light force |
| Good | Can be wiped off |
| Fair | Slightly unwiped off |
| Bad | Cannot be wiped off |

Scratch Resistance

A cloth was pressed to each test piece with a load of 12.5N at room temperature (25° C.) by a Martindale abrasion tester, and the cloth was went back and forth for 500 cycles at a speed of 60 cycles/min. to evaluate a scratch resistance. Then, the surface state was observed visually. A scratch degree was measured by a surface roughness meter with comparing Rz (average coarseness of a maximum of ten points) in a measurement distance of 40 mm to calculate ΔRz. ΔRz was calculated from the following equation, and a lower numeral value was judged to have difficulty of scratch.

$$\Delta Rz = Rz \text{ (after test)} - Rz \text{ (before test)}$$

The scratch resistance was evaluated according to the following standard.

| | Scratch resistance |
|---|---|
| Good | No visible scratch |
| Fair | Slight visible scratch |
| Bad | Clear visible scratch |

Liquid Repellency of Detergent

A contact angle of a detergent (ATTACK NEO: manufactured by Kao Corp.) on each test piece was measured at room temperature (25° C.). The amount of a liquid droplet at the time of measurement was set to be 2 μL.

Adhesivity of Detergent

After a detergent (ATTACK NEO: manufactured by Kao Corp.) was dropped on each test piece, the test piece was leaned to 90 degrees and a trace of detergent flow was observed after 60 seconds. The measurement was performed at room temperature (25° C.). An adhesivity of the detergent was evaluated according to the following standard.

| | Adhesivity of detergent |
|---|---|
| Good | Detergent flowed cleanly |
| Fair | Detergent adheres slightly |
| Bad | Detergent adheres thickly |

Preparative Example 1

$CH_2=C(-CH_3)-C(=O)-O-(CH_2)_2-(CF_2)_5CF_3$ (hereinafter referred to as "C6SFMA") (26.80 g), stearyl acrylate (hereinafter referred to as "StA") (40.20 g) and isopropyl alcohol (hereinafter referred to as "IPA") (100.50 g) as solvent were charged into a 300 mL flask, an internal temperature was set to be 65° C. with stirring, azobisisobutyronitrile (hereinafter referred to as "AIBN") (0.82 g) was added, a mixture was kept for 10 hours, and the solvent was removed to obtain a fluorine-containing copolymer.

Preparative Example 2

A fluorine-containing copolymer was obtained in the same manner as in Preparation Example 1 except that C6SFMA was 28.81 g, StA was 38.19 g, IPA was 102.51 g and AIBN was 0.47 g.

Preparative Example 3

A fluorine-containing copolymer was obtained in the same manner as in Preparation Example 1 except that C6SFMA was 30.15 g, StA was 36.85 g, IPA was 102.51 g and AIBN was 0.74 g.

Preparative Example 4

A fluorine-containing copolymer was obtained in the same manner as in Preparative Example 1 except that C6SFMA was 33.50 g, StA was 33.50 g, IPA was 101.84 g and AIBN was 0.60 g.

Preparative Example 5

A fluorine-containing copolymer was obtained in the same manner as in Preparative Example 1 except that C6SFMA was 38.86 g, StA was 28.14 g, IPA was 89.11 g and AIBN was 0.47 g.

Preparative Example 6

A fluorine-containing copolymer was obtained in the same manner as in Preparative Example 1 except that C6SFMA was 43.55 g, StA was 23.45 g, IPA was 100.50 g and AIBN was 0.67 g.

Comparative Preparative Example 1

A fluorine-containing copolymer was obtained in the same manner as in Preparation Example 1 except that C6SFMA was 32.16 g, StA was 34.84 g, IPA was 134.00 g and AIBN was 1.34 g.

Comparative Preparative Example 2

A fluorine-containing copolymer was obtained in the same manner as in Preparation Example 1 except that IPA was 67.00 g and AIBN was 0.47 g.

Comparative Preparative Example 3

A fluorine-containing copolymer was obtained in the same manner as in Preparation Example 1 except that C6SFMA was 32.16 g, lauryl acrylate (hereinafter referred to as "LA") was 34.84 g, IPA was 93.80 g and AIBN was 0.54 g.

Each molecular weight in Preparative Examples 1-6 and Comparative Preparative Examples 1-3 is shown in Table 1.

TABLE 1

| | Monomer species | | Ratio | | |
| --- | --- | --- | --- | --- | --- |
| | Fluorine-containing monomer | Fluorine-free monomer | Fluorine-containing monomer | Fluorine-free monomer | Molecular weight |
| Pre. Ex. 1 | C6SFMA | StA | 40 | 60 | 7000 |
| Pre. Ex. 2 | C6SFMA | StA | 43 | 57 | 10000 |
| Pre. Ex. 3 | C6SFMA | StA | 45 | 55 | 7000 |
| Pre. Ex. 4 | C6SFMA | StA | 50 | 50 | 9000 |
| Pre. Ex. 5 | C6SFMA | StA | 58 | 42 | 14000 |
| Pre. Ex. 6 | C6SFMA | StA | 65 | 35 | 7000 |
| Com. Pre. Ex. 1 | C6SFMA | StA | 48 | 52 | 2000 |
| Com. Pre. Ex. 2 | C6SFMA | StA | 48 | 52 | 25000 |
| Com. Pre. Ex. 3 | C6SFMA | LA | 45 | 55 | 7000 |

Examples 1 to 14 and Comparative Examples 1 to 8

A propylene homopolymer (homo PP) (MFR 7.5 g/10 min) and a fluorine-containing polymer were mixed as in Tables 2 and 3, the melt kneading was carried out at 200° C. by a twin screw extruder to produce mixed pellets. Then, the obtained mixed pellets were injection-molded by an injection molding machine at 210° C. to produce a 6 cm×6 cm square and 3 mm thickness plate. The measurement results are shown in Tables 2 and 3. The results of the liquid repellency of detergent and the adhesivity of detergent are shown in Table 8.

Example 15

A fluorine-containing polymer was mixed with a propylene ethylene block copolymer (block PP) (MFR 30 g/10 min) (100 parts by weight) as in Table 4, the melt kneading was carried out by a twin screw extruder at 200° C. to produce mixed pellets. Then, the obtained mixed pellets were injection-molded by an injection molding machine at 210° C. to produce a 6 cm×6 cm square and 3 mm thickness plate. The measurement results are shown in Table 4.

Examples 16 to 18 and Comparative Examples 9 to 11

A fluorine-containing polymer was mixed with high-density polyethylene (HDPE) (MFR 30 g/10 min) (100 parts by weight) as in Table 5, the melt kneading was carried out by a twin screw extruder at 200° C. to produce mixed pellets. Then, the obtained mixed pellets were injection-molded by an injection molding machine at 200° C. to produce a 6 cm×6 cm square and 3 mm thickness plate. The measurement results are shown in Table 5.

Examples 19-21 and the Comparative Examples 12-14

A fluorine-containing polymer was mixed with vinyl chloride (PVC) (average degree of polymerization 1000) (100 parts by weight) as in Table 6, the melt kneading was carried out by a twin screw extruder at 200° C. to produce mixed pellets. Then, the obtained mixed pellets were injection-molded by an injection molding machine at 200° C. to produce a 6 cm×6 cm square and 3 mm thickness plate. The measurement results are shown in Table 6.

Examples 22-24 and the Comparative Examples 15-17

As a polyurethane resin, a polyurethane polymer formed from polyhexane adipate, 1,4-butanediol and hexamethylene diisocyanate was obtained by a mass polymerization method. After pulverizing this resin, the powder was mixed according to the composition table shown in Table 7, and kneaded at 190° C. with a twin screw extruder, to obtain mixed pellets. Then, the obtained mixed pellets were injection-molded by an injection molding machine at 190° C. to produce a 6 cm×6 cm square and 3 mm thickness plate. The measurement results are shown in Table 7.

TABLE 2

| | Thermo-plastic resin | F copolymer | Mix amount PP | Mix amount F copolymer | Oil repellency Oleic acid contact angle (degree) | Coefficient of friction Coefficient of static friction | Soil resistance Trace after wiping Coffee | Soy sauce | Oleic acid | Black felt-tip pen | Scratch resistance $\Delta$Rz | Visual |
|---|---|---|---|---|---|---|---|---|---|---|---|---|
| Com. Ex. 1 | Homo PP | — | 100 | — | 23 | 0.51 | Bad | Bad | Bad | Bad | 0.14 | Bad |
| Ex. 1 | ↑ | Pre. Ex. 1 | ↑ | 1.2 | 40 | 0.37 | Good | Good | Bad | Bad | 0.06 | Fair |
| Ex. 2 | ↑ | Pre. Ex. 2 | ↑ | 1.2 | 42 | 0.36 | Good | Fair | Fair | Fair | 0.05 | Fair |
| Ex. 3 | ↑ | Pre. Ex. 3 | ↑ | 1.2 | 58 | 0.33 | Excellent | Good | Good | Good | 0.03 | Good |
| Ex. 4 | ↑ | Pre. Ex. 4 | ↑ | 1.2 | 59 | 0.34 | Excellent | Good | Good | Good | 0.02 | Good |
| Ex. 5 | ↑ | Pre. Ex. 5 | ↑ | 1.2 | 43 | 0.34 | Good | Fair | Fair | Fair | 0.05 | Fair |
| Ex. 6 | ↑ | Pre. Ex. 6 | ↑ | 1.2 | 41 | 0.35 | Good | Good | Bad | Good | 0.05 | Fair |
| Com. Ex. 2 | ↑ | Com. Pre. Ex. 1 | ↑ | 1.2 | 28 | 0.48 | Bad | Bad | Bad | Bad | 0.15 | Bad |
| Com. Ex. 3 | ↑ | Com. Pre. Ex. 1 | ↑ | 2 | 31 | 0.47 | Bad | Bad | Bad | Bad | 0.14 | Bad |
| Com. Ex. 4 | ↑ | Com. Pre. Ex. 1 | ↑ | 5 | 33 | 0.44 | Bad | Bad | Bad | Bad | 0.14 | Bad |
| Com. Ex. 5 | ↑ | Com. Pre. Ex. 2 | ↑ | 1.2 | 23 | 0.5 | Bad | Bad | Bad | Bad | 0.14 | Bad |
| Com. Ex. 6 | ↑ | Com. Pre. Ex. 2 | ↑ | 2 | 25 | 0.49 | Bad | Bad | Bad | Bad | 0.14 | Bad |
| Com. Ex. 7 | ↑ | Com. Pre. Ex. 2 | ↑ | 5 | 26 | 0.49 | Bad | Bad | Bad | Bad | 0.14 | Bad |
| Com. Ex. 8 | ↑ | Com. Pre. Ex. 3 | ↑ | 1.2 | 34 | 0.42 | Bad | Bad | Bad | Bad | 0.10 | Bad |

TABLE 3

| | Thermo-plastic resin | F copolymer | Mix amount PP | Mix amount F copolymer | Oil repellency Oleic acid contact angle (degree) | Coefficient of friction Coefficient of static friction | Soil resistance Trace after wiping Coffee | Soy sauce | Oleic acid | Black felt-tip pen | Scratch resistance $\Delta$Rz | Visual |
|---|---|---|---|---|---|---|---|---|---|---|---|---|
| Ex. 7 | Homo PP | Pre. Ex. 3 | 100 | 0.8 | 40 | 0.37 | Good | Good | Bad | Bad | 0.05 | Fair |
| Ex. 3 | ↑ | ↑ | ↑ | 1.2 | 58 | 0.33 | Excellent | Good | Good | Good | 0.03 | Good |
| Ex. 8 | ↑ | ↑ | ↑ | 2 | 65 | 0.28 | Excellent | Excellent | Good | Good | 0.02 | Good |
| Ex. 9 | ↑ | ↑ | ↑ | 5 | 68 | 0.26 | Excellent | Excellent | Excellent | Excellent | 0.01 | Excellent |
| Ex. 10 | ↑ | ↑ | ↑ | 8 | 68 | 0.26 | Excellent | Excellent | Excellent | Excellent | 0.03 | Good |
| Ex. 11 | Homo PP | Pre. Ex. 1 | 100 | 0.8 | 37 | 0.38 | Good | Good | Bad | Bad | 0.06 | Fair |
| Ex. 1 | ↑ | ↑ | ↑ | 1.2 | 40 | 0.37 | Good | Good | Bad | Bad | 0.06 | Fair |
| Ex. 12 | ↑ | ↑ | ↑ | 2 | 45 | 0.33 | Good | Good | Good | Good | 0.05 | Fair |
| Ex. 13 | ↑ | ↑ | ↑ | 5 | 50 | 0.29 | Excellent | Excellent | Good | Good | 0.03 | Good |
| Ex. 14 | ↑ | ↑ | ↑ | 8 | 50 | 0.30 | Excellent | Excellent | Good | Good | 0.04 | Fair |

TABLE 4

| | Thermo-plastic resin | F copolymer | Mix amount PP | Mix amount F copolymer | Oil repellency Oleic acid contact angle (degree) | Coefficient of friction Coefficient of static friction | Soil resistance Trace after wiping Coffee | Soy sauce | Oleic acid | Black felt-tip pen | Scratch resistance $\Delta$Rz | Visual |
|---|---|---|---|---|---|---|---|---|---|---|---|---|
| Ex. 1 | Homo PP | Pre. Ex. 2 | 100 | 1.2 | 58 | 0.33 | Excellent | Good | Good | Good | 0.03 | Good |
| Ex. 15 | Block PP | Pre. Ex. 2 | ↑ | 1.2 | 62 | 0.30 | Excellent | Excellent | Good | Good | 0.03 | Good |

TABLE 5

| | Thermo-plastic resin | F copolymer | Mix amount PP | Mix amount F copolymer | Oil repellency Oleic acid contact angle (degree) | Coefficient of friction Coefficient of static friction | Soil resistance Trace after wiping Coffee | Soy sauce | Oleic acid | Black felt-tip pen | Scratch resistance Visual |
|---|---|---|---|---|---|---|---|---|---|---|---|
| Com. Ex. 9 | HDPE | — | 100 | — | 20 | 0.2 | Bad | Bad | Bad | Bad | Bad |
| Ex. 16 | ↑ | Pre. Ex. 1 | ↑ | 1.2 | 34 | 0.17 | Good | Good | Bad | Good | Fair |
| Ex. 17 | ↑ | Pre. Ex. 3 | ↑ | 1.2 | 50 | 0.15 | Excellent | Good | Good | Excellent | Good |
| Ex. 18 | ↑ | Pre. Ex. 6 | ↑ | 1.2 | 36 | 0.17 | Good | Good | Bad | Good | Fair |
| Com. Ex. 10 | ↑ | Com. Pre. Ex. 1 | ↑ | 1.2 | 23 | 0.19 | Bad | Bad | Bad | Bad | Bad |
| Com. Ex. 11 | ↑ | Com. Pre. Ex. 2 | ↑ | 1.2 | 24 | 0.19 | Bad | Bad | Bad | Bad | Bad |

TABLE 6

| | Thermo-plastic resin | F copolymer | Mix amount PVC | Mix amount F copolymer | Oil repellency Oleic acid contact angle (degree) | Coefficient of friction Coefficient of static friction | Soil resistance Trace after wiping Coffee | Soy sauce | Oleic acid | Black felt-tip pen | Scratch resistance Visual |
|---|---|---|---|---|---|---|---|---|---|---|---|
| Com. Ex. 12 | PVC | — | 100 | — | 40 | 0.33 | Bad | Bad | Bad | Bad | Bad |
| Ex. 19 | ↑ | Pre. Ex. 1 | ↑ | 1.2 | 52 | 0.24 | Good | Good | Bad | Good | Good |
| Ex. 20 | ↑ | Pre. Ex. 3 | ↑ | 1.2 | 60 | 0.19 | Excellent | Good | Good | Excellent | Excellent |
| Ex. 21 | ↑ | Pre. Ex. 6 | ↑ | 1.2 | 51 | 0.23 | Good | Good | Bad | Good | Good |
| Com. Ex. 13 | ↑ | Com. Pre. Ex. 1 | ↑ | 1.2 | 45 | 0.32 | Bad | Bad | Bad | Bad | Bad |
| Com. Ex. 14 | ↑ | Com. Pre. Ex. 2 | ↑ | 1.2 | 43 | 0.33 | Bad | Bad | Bad | Bad | Bad |

TABLE 7

| | Thermo-plastic resin | F copolymer | Mix amount PU | Mix amount F copolymer | Oil repellency Oleic acid contact angle (degree) | Coefficient of friction Coefficient of static friction | Soil resistance Trace after wiping Coffee | Soy sauce | Oleic acid | Black felt-tip pen | Scratch resistance Visual |
|---|---|---|---|---|---|---|---|---|---|---|---|
| Com. Ex. 15 | PU | — | 100 | — | 42 | 0.59 | Bad | Bad | Bad | Bad | Bad |
| Ex. 22 | ↑ | Pre. Ex. 1 | ↑ | 1.2 | 50 | 0.49 | Good | Good | Bad | Good | Good |
| Ex. 23 | ↑ | Pre. Ex. 3 | ↑ | 1.2 | 54 | 0.46 | Good | Good | Good | Excellent | Excellent |
| Ex. 24 | ↑ | Pre. Ex. 6 | ↑ | 1.2 | 52 | 0.49 | Good | Good | Bad | Good | Good |
| Com. Ex. 16 | ↑ | Com. Pre. Ex. 1 | ↑ | 1.2 | 43 | 0.58 | Bad | Bad | Bad | Bad | Bad |
| Com. Ex. 17 | ↑ | Com. Pre. Ex. 2 | ↑ | 1.2 | 43 | 0.59 | Bad | Bad | Bad | Bad | Bad |

TABLE 8

| | Thermoplastic resin | F copolymer | Mix amount PP | Mix amount F copolymer | Liquid repellency of detergent Detergent contact angle (degree) | Adhesivity of detergent Detergent |
|---|---|---|---|---|---|---|
| Com. Ex. 1 | Homo PP | — | 100 | — | 25 | Bad |
| Ex. 1 | ↑ | Pre. Ex. 1 | ↑ | 1.2 | 42 | Fair |
| Ex. 3 | ↑ | Pre. Ex. 3 | ↑ | 1.2 | 50 | Good |
| Ex. 6 | ↑ | Pre. Ex. 6 | ↑ | 1.2 | 45 | Fair |
| Com. Ex. 2 | ↑ | Com. Pre. Ex. 1 | ↑ | 1.2 | 29 | Bad |
| Com. Ex. 5 | ↑ | Com. Pre. Ex. 2 | ↑ | 1.2 | 28 | Bad |

INDUSTRIAL APPLICABILITY

The molded body of the present invention can be used in applications where a thermoplastic resin is used, particularly in the applications where excellent easiness of wiping-off stains and excellent scratch resistance are required. Applications of the molded body include an automobile (an exterior component and an interior component) (for example, a bumper, an instrumental panel and a door trim), and a home electric appliance (for example, a washing machine and a refrigerator) (for example, a housing, and a door, a tray and a vegetable chamber in a refrigerator), various cases, buildings (interior and parts) (for example, handrail, a wall paper, a desk, a chair, a toilet seat, a toilet seat cover and a bathtub), and an electronic apparatus (for example, a housing of a smart phone), a drain ditch, a pipe, a tableware, a flooring material, a gasoline tank, a fuel hose, and an OA apparatus. Interior parts of the home electric appliance are preferable.

The invention claimed is:

1. A resin composition comprising:
   (1) a thermoplastic resin, and
   (2) a fluorine-containing copolymer,
   wherein the fluorine-containing copolymer (2) is a copolymer which comprises:
   (a) a repeating unit formed from a fluorine-containing monomer represented by the formula:

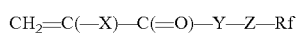

wherein X is a methyl group,
   Y is —O— or —NH—,
   Z is a direct bond or an divalent organic group linear alkylene group or branched alkylene group having 1-20 carbon atoms, and
   Rf is a fluoroalkyl group having 4 to 6 carbon atoms, and
   (b) a repeating unit formed from a fluorine-free monomer containing a hydrocarbon group having at least 14 carbon atoms, and
   which has a weight-average molecular weight of 2,500 to 20,000.

2. The resin composition according to claim 1, wherein the thermoplastic resin (1) is at least one selected from the group consisting of a polypropylene resin, a polyethylene resin, a polyvinyl chloride resin, a polyurethane resin, a polystyrene resin, an acrylonitrile/butadiene/styrene resin (ABS resin), an alloy of a polycarbonate resin and an acrylonitrile/butadiene/styrene resin (PC/ABS alloy), and a polycarbonate resin (PC resin).

3. The resin composition according to claim 1, wherein the fluorine-free monomer (b), which is a fluorine-free non-crosslinkable monomer containing non-cyclic hydrocarbon group or a cyclic hydrocarbon group having at least 14 carbon atoms, is a (meth)acrylate ester in which an acryloyloxy group is bonded to a monovalent non-cyclic hydrocarbon group or cyclic hydrocarbon group having 14-30 carbon atoms.

4. The resin composition according to claim 1, wherein the fluorine-free monomer (b) is an acrylate ester in which an alpha-position is a hydrogen atom.

5. The resin composition according to claim 1, wherein the fluorine-containing copolymer (2) further comprises (c) a repeating unit formed from a fluorine-free crosslinkable monomer, and the amount of the monomer (c) is 0.1 to 100 parts by weight, based on 100 parts by weight of the total of the monomer (a) and the monomer (b).

6. The resin composition according to claim 1, wherein the fluorine-containing copolymer (2) has a weight-average molecular weight of 3,000 to 15,000.

7. The resin composition according to claim 1, wherein, in the fluorine-containing copolymer (2), a weight ratio of the fluorine-containing monomer (a) to the fluorine-free monomer (b) is 35:65 to 70:30 and the amount of the fluorine-containing monomer (a) is at least 25 wt %, based on the fluorine-containing copolymer.

8. The resin composition according to claim 1, wherein the amount of the fluorine-containing copolymer (2) is 0.01 to 50 parts by weight, based on 100 parts by weight of the thermoplastic resin (1).

9. A molded body formed from the resin composition according to claim 1.

10. A method of producing a molded body, comprising steps of:
    (i) mixing a thermoplastic resin (1) with a fluorine-containing copolymer (2) to obtain a resin composition; and
    (ii) molding the resin composition,
    wherein the fluorine-containing copolymer (2) is a copolymer which comprises:
    (a) a repeating unit formed from a fluorine-containing monomer represented by the formula:

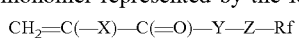

wherein X is a methyl group,
    Y is —O— or —NH—,
    Z is a linear alkylene group or branched alkylene group having 1-20 carbon atoms, and
    Rf is a fluoroalkyl group having 4 to 6 carbon atoms, and
    (b) a repeating unit formed from a fluorine-free monomer containing a hydrocarbon group having at least 14 carbon atoms, and which has a weight-average molecular weight of 2,500 to 20,000.

11. The resin composition according to claim 1, wherein a weight ratio of the fluorine-containing monomer (a) to the fluorine-free monomer (b) is 45:55 to 50:50.

12. The resin composition according to claim 1, wherein the fluorine-free monomer (b) is at least one selected from the group consisting of cetyl (meth)acrylate, stearyl (meth)acrylate and behenyl (meth)acrylate.

13. A method of making a molded body from which stains are easily removed and having excellent scratch resistance, which method comprises:
  molding a resin composition, and
  wherein the resin composition comprises:
  (1) a thermoplastic resin, and
  (2) a fluorine-containing copolymer,
  wherein the fluorine-containing copolymer (2) is a copolymer which comprises:
  (a) a repeating unit formed from a fluorine-containing monomer represented by the formula:

$CH_2=C(-X)-C(=O)-Y-Z-Rf$ wherein X is a methyl group,
  Y is —O— or —NH—,
  Z is a linear alkylene group or branched alkylene group having 1-20 carbon atoms, and
  Rf is a fluoroalkyl group having 4 to 6 carbon atoms, and
  (b) a repeating unit formed from a fluorine-free monomer containing a hydrocarbon group having at least 14 carbon atoms, and
  which has a weight-average molecular weight of 2,500 to 20,000, and wherein a weight ratio of the fluorine-containing monomer (a) to the fluorine-free monomer (b) is 35:65 to 70:30.

14. The method according to claim 13, wherein the fluorine-free monomer (b) is at least one selected from the group consisting of cetyl (meth)acrylate, stearyl (meth)acrylate and behenyl (meth)acrylate.

15. The method according to claim 13, wherein a weight ratio of the fluorine-containing monomer (a) to the fluorine-free monomer (b) is 45:55 to 50:50.

16. The method according to claim 13, wherein the molded body is at least one selected from interior parts of automobile, interior parts of home electric appliance, and buildings.

* * * * *